United States Patent
Ahn et al.

(10) Patent No.: US 7,750,543 B2
(45) Date of Patent: Jul. 6, 2010

(54) LAMP PROVIDED WITH EXTERNAL ELECTRODE SECTION HAVING DIFFERENT CONFIGURATION THAN EMITTER SECTION AND BACKLIGHT INCORPORATING THE LAMP FOR USE IN LIQUID CRYSTAL DISPLAYS

(75) Inventors: Byung Chul Ahn, Seoul (KR); Jin Woo Hong, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 607 days.

(21) Appl. No.: 11/639,322

(22) Filed: Dec. 15, 2006

(65) Prior Publication Data
US 2007/0152596 A1 Jul. 5, 2007

(30) Foreign Application Priority Data
Dec. 30, 2005 (KR) .................... 10-2005-0135028

(51) Int. Cl.
*H01J 11/02* (2006.01)
*H01J 65/00* (2006.01)

(52) U.S. Cl. .................... 313/234; 313/607; 313/594; 313/634

(58) Field of Classification Search ................ 313/634, 313/493, 234, 607, 594
See application file for complete search history.

(56) References Cited

U.S. PATENT DOCUMENTS

| | | | |
|---|---|---|---|
| 5,013,966 A * | 5/1991 | Saikatsu et al. | 313/234 |
| 6,331,064 B1 * | 12/2001 | Nishiyama et al. | 313/234 |
| 7,230,383 B2 * | 6/2007 | Tsuda et al. | 313/634 |
| 2004/0001345 A1 * | 1/2004 | Lee et al. | 362/296 |
| 2005/0184640 A1 * | 8/2005 | Yamashita et al. | 313/493 |

FOREIGN PATENT DOCUMENTS

| | | |
|---|---|---|
| CN | 1421729 A | 6/2003 |
| CN | 1190690 C | 2/2005 |
| JP | 2005-243351 | 9/2005 |
| JP | 2005-268098 | 9/2005 |
| JP | 2006024548 A * | 1/2006 |
| WO | WO 2005/117066 A1 | 12/2005 |

* cited by examiner

Primary Examiner—Mariceli Santiago
(74) Attorney, Agent, or Firm—McKenna Long & Aldridge (57) ABSTRACT

A lamp and a back light unit for improved brightness and efficiency are disclosed. In the lamp, a transparent tube is sealed with a discharge gas. A fluorescent material is formed within the transparent tube in an emitter section that generates light. Electrodes are installed at both sides of the glass tube.

11 Claims, 11 Drawing Sheets

LAMP PROVIDED WITH EXTERNAL ELECTRODE SECTION HAVING DIFFERENT CONFIGURATION THAN EMITTER SECTION AND BACKLIGHT INCORPORATING THE LAMP FOR USE IN LIQUID CRYSTAL DISPLAYS

This application claims the benefit of Korean Patent Application No. P05-0135028, filed on Dec. 30, 2005, which is hereby incorporated by reference for all purposes as if fully set forth herein.

BACKGROUND OF THE INVENTION

1. Field of the Invention

The present invention relates to a liquid crystal display, and more particularly to a lamp and a back light unit thereof adapted for improved brightness and efficiency. The present invention also relates to a liquid crystal display adapted for increased brightness and decreased power consumption using the back light unit.

2. Discussion of the Related Art

Liquid crystal displays have wide applicability because of their lightness, thinness, and low driving power consumption, by way of example. According to this upward trend, the liquid crystal display may be used in office automation equipment and audio/video equipment by way of non-limiting example. The liquid crystal display controls the amount of transmitted light in accordance with a signal applied to a plurality of control switches which are arranged in a matrix shape. Thus, a desired picture is displayed on a screen.

The liquid crystal display device is not a self-luminous display device, thus it requires a separate light source such as a back light.

Back lights may be classified into a direct type and an edge type depending on the location of a light source. The edge type back light has a light source installed at the edge of one side of a liquid crystal display, and irradiates an incident light from the light source to a liquid crystal display panel through a light guide panel and a plurality of optical sheets. The direct type back light has a plurality of light sources disposed directly under the liquid crystal display, and irradiates the incident light from the light sources to the liquid crystal display panel through a diffusion plate and a plurality of optical sheets. Recently, the direct type backlight of which brightness, light uniformity and color purity are higher than those of the edge type backlight, is more often used in LCD TVs.

The light source used as the back light may be a Cold Cathode Fluorescent Lamp (hereinafter, referred to as "CCFL") and an External Electrode Fluorescent Lamp (hereinafter, referred to as "EEFL"), for example.

Figure 1:
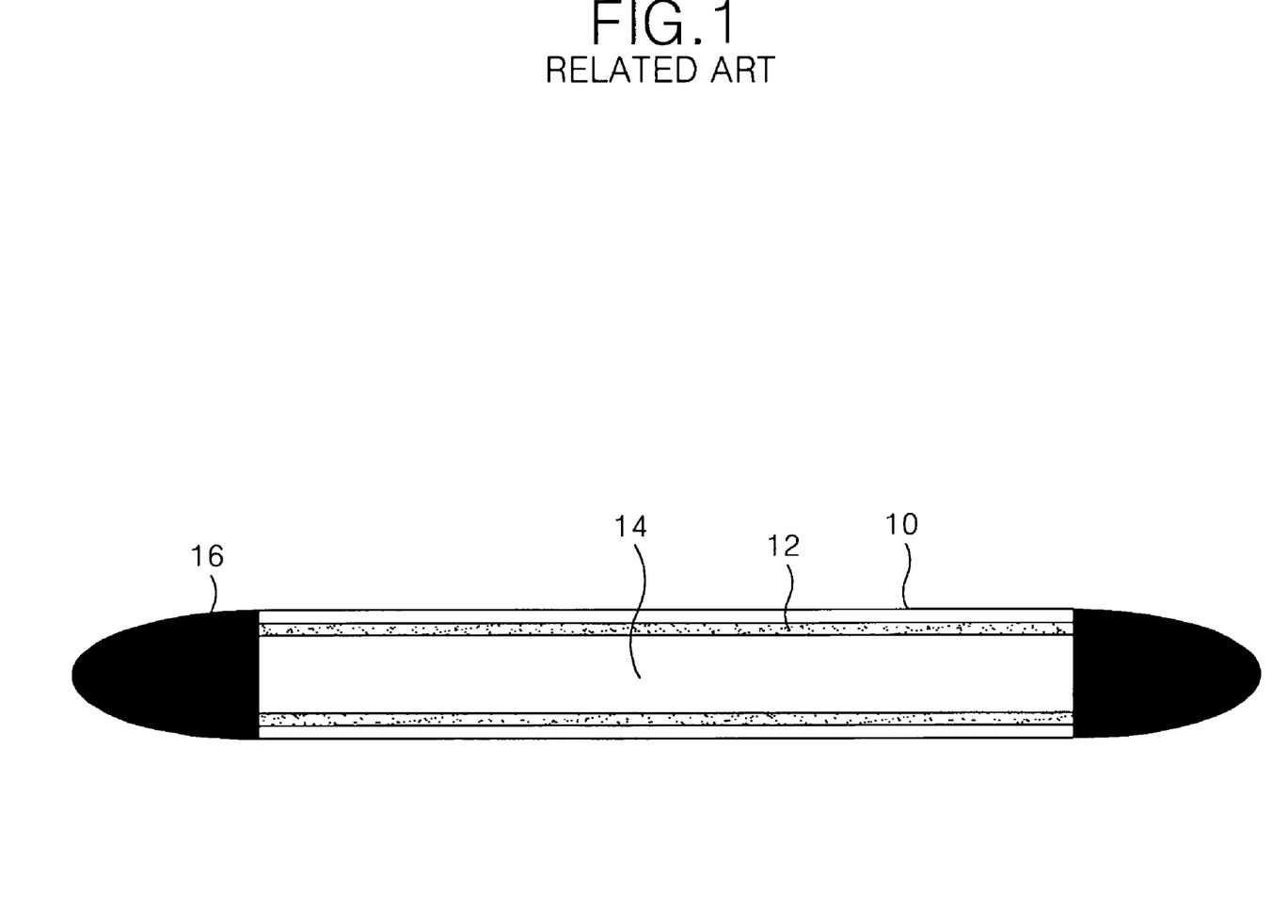
FIG. 1 is a diagram showing a related art lamp.

Referring to FIG. 1, a related art EEFL is comprised of a glass tube 10, a fluorescent material 12 coated at an inside wall of the glass tube 10, inactive gasses 14 (or discharge gas) injected within the glass tube 10 and an external electrode 16 installed at external sides of both edges of the glass tube 10.

The glass tube 10 may be elliptical with an internal diameter approximately 1.6 mm, an external diameter approximately 2.0 mm, and a length of the glass tube 10 approximately 50~400 mm.

The inactive gasses 14 may be a combination of Ne and Ar having a constant ratio, and include an amount of Hg.

If an alternating voltage from an inverter is applied to a high pressure electrode and a low pressure electrode, then an electron emitted from the low pressure electrode of the EEFL collides with the inactive gasses within the glass tube to thereby exponentially increase the quantity of electrons. The inactive gas is excited by the electrons and emits ultraviolet rays. The ultraviolet rays collide with the fluorescent material coated at the internal wall of the glass tube to emit visible rays.

In the EEFL, the length of the glass tube 10 has been increasing because of the increased size of the liquid crystal display. If the length of the glass tube 10 increases then thickness of the glass tube and diameter of the glass tube 10 are increased. In such a discharge tube, if the thickness of the glass tube 10 is increased, then brightness and efficiency of the lamp decrease, and if the length of the glass tube is increased, then distance between electrodes is increased. Thus, driving voltage for generating discharge is increased. Furthermore, if the diameter of the glass tube 10 is increased, then brightness of the lamp is decreased. The liquid crystal display using a back light unit having a low brightness and poor efficiency of the lamp as a light source results in low brightness and high power consumption.

SUMMARY OF THE INVENTION

Accordingly, the present invention provides a lamp and a back light unit thereof adapted for improved brightness and efficiency.

Also, the present invention provides a liquid crystal display adapted for increased brightness and decreased power consumption using the back light unit.

Additional features and advantages of the present invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages of the invention, a lamp according to an aspect of the present invention comprises a transparent tube sealed with a discharge gas wherein the transparent tube has an emitter section and an electrode section; a fluorescent material formed within the emitter section that generates light; and electrodes installed at both sides of the glass tube, wherein the emitter section and the electrode section where the electrodes are installed are substantially different from each other, and the emitter section is of a geometry such that brightness and efficiency are optimal.

In the emitter section, a minor axis length of the transparent tube is substantially shorter than the diameter of the electrode section of the transparent tube, and a major axis length of the transparent tube is substantially longer than the transparent tube diameter of the electrode section.

In the electrode section, if an external diameter of the transparent tube is defined as 'x', a relationship of the minor axis length of the transparent tube (b) and the major axis length of the transparent tube (a) is as follows, $$\frac{\pi * x}{2} = \sqrt{(a^2 - b^2)\sin^2\theta + b^2}$$

wherein the major axis length is about 1~1.6 times the minor axis length.

A back light unit according to an aspect of the present invention comprises a plurality of lamps including a transparent tube including a sealed discharge gas wherein the transparent tube has an emitter section and an electrode section, a fluorescent material formed within the emitter section generating a light and electrodes installed at both sides of the glass tube and wherein the emitter section and the electrode section where the electrodes are installed are substantially different from each other, and the emitter section is of a geometry such that brightness and efficiency are optimal; a bottom cover enclosing the plurality of lamps in such a manner that a wide surface of the transparent tube substantially faces upward and a reflection sheet formed under the lamps; a diffusion plate covering the bottom cover and diffusing a light from the lamps; and a plurality of optical sheets arranged on the diffusion plate.

In the back light unit, in the emitter section, a minor axis length of the transparent tube is substantially shorter than a transparent tube diameter of the electrode section, and a major axis length of the transparent tube is substantially longer than the diameter of the electrode section of the transparent tube.

In the back light unit, in the electrode section, if an external diameter of the transparent tube is defined as 'x', a relationship of the minor axis length of the transparent tube (b) and the major axis length of the transparent tube (a) is as follows, $$\frac{\pi * x}{2} = \sqrt{(a^2 - b^2)\sin^2\theta + b^2}$$

wherein the major axis length is about 1~1.6 times the minor axis length.

A back light unit according to another aspect of the present invention comprises at least one lamp including a transparent tube with a sealed discharge gas wherein the transparent tube has an emitter section and an electrode section, a fluorescent material formed within the emitter section generating a light and electrodes installed at both sides of the glass tube and wherein the emitter section and the electrode section where the electrodes are installed are substantially different from each other, and the emitter section is of a geometry such that brightness and efficiency are optimal; a light guide plate converting the light incident from an incident surface facing the wide surface of the transparent tube into a surface light source type; and a plurality of optical sheets arranged on the light guide plate.

The back light unit may further include a lamp housing enclosing the lamp at a portion other than an exit surface of the lamp opposite to an incident surface of the light guide plate.

In the back light unit, in the emitter section, a minor axis length of the transparent tube is substantially shorter than a transparent tube diameter of the electrode section, and a major axis length of the transparent tube is substantially longer than the diameter of the electrode section of the transparent tube.

In the back light unit, in the electrode section, if an external diameter of the transparent tube is defined as 'x', a relationship of the minor axis length of the transparent tube (b) and the major axis length of the transparent tube (a) is as follows, $$\frac{\pi * x}{2} = \sqrt{(a^2 - b^2)\sin^2\theta + b^2}$$

wherein the major axis length is about 1~1.6 times the minor axis length.

A liquid crystal display according to an aspect of the present invention comprises a back light unit including a transparent tube with a sealed discharge gas wherein the transparent tube has an emitter section and an electrode section, a fluorescent material formed within the emitter section generating a light and electrodes installed at both sides of the glass tube and wherein the emitter section and the electrode section where the electrodes are installed are substantially different from each other, a plurality of lamps having the emitter section that is of a geometry such that brightness and efficiency are optimal, a bottom cover enclosing the plurality of lamps in such a manner that a wide surface of the transparent tube substantially faces upward and a reflection sheet formed under the lamps, a diffusion plate covering the bottom cover and diffusing a light from the lamps, and a plurality of optical sheets arranged on the diffusion plate; and a liquid crystal panel electrically controlling a liquid crystal and modulating a light irradiated from the back light unit to thereby display a picture.

In the liquid crystal display, in the electrode section, if an external diameter of the transparent tube is defined as 'x', a relationship of the minor axis length of the transparent tube (b) and the major axis length of the transparent tube (a) is as follows, $$\frac{\pi * x}{2} = \sqrt{(a^2 - b^2)\sin^2\theta + b^2}$$

wherein the major axis length is about 1~1.6 times the minor axis length.

A liquid crystal display according to another aspect of the present invention comprises a back light unit including a transparent tube with a sealed discharge gas wherein the transparent tube has an emitter section and an electrode section, a fluorescent material formed within the emitter section generating a light and electrodes installed at both sides of the glass tube and wherein the emitter section and the electrode section where the electrodes are installed are substantially different from each other, at least one lamp having the emitter section of a geometry such that brightness and efficiency are optimal, a light guide plate converting the light incident from an incident surface facing the wide surface of the transparent tube into a surface light source type, and a plurality of optical sheets arranged on the light guide plate; and a liquid crystal panel electrically controlling a liquid crystal and modulating a light irradiated from the back light unit to thereby display a picture.

In the liquid crystal display, in the electrode section, if an external diameter of the transparent tube is defined as 'x', a relationship of the minor axis length of the transparent tube (b) and the major axis length of the transparent tube (a) is as follows, $$\frac{\pi * x}{2} = \sqrt{(a^2 - b^2)\sin^2\theta + b^2}$$

wherein the major axis length is 1~1.6 times the minor axis length.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the embodiments of the present invention, examples of which are illustrated in the accompanying drawings.

Figure 2:
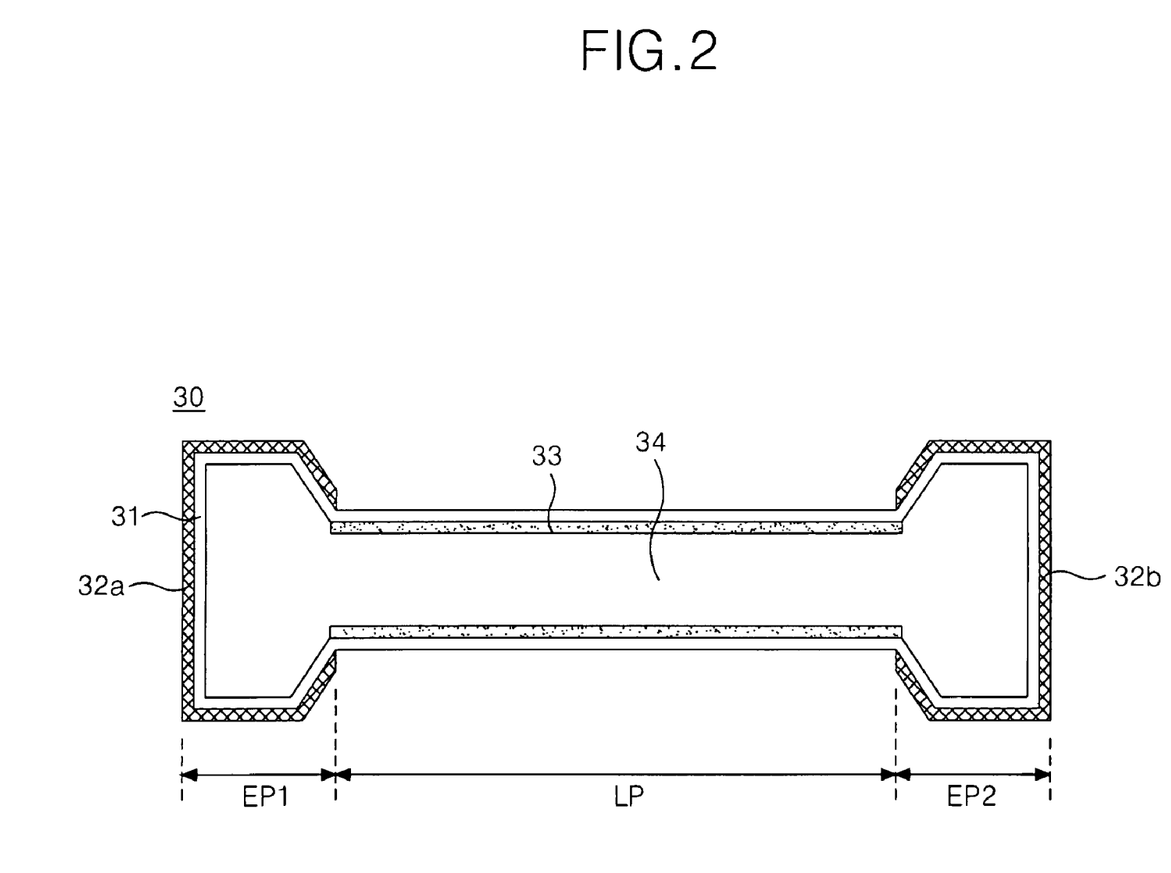
FIG. 2 is a cross-sectional view of a lamp according to a first embodiment of the present invention.
Figure 3:
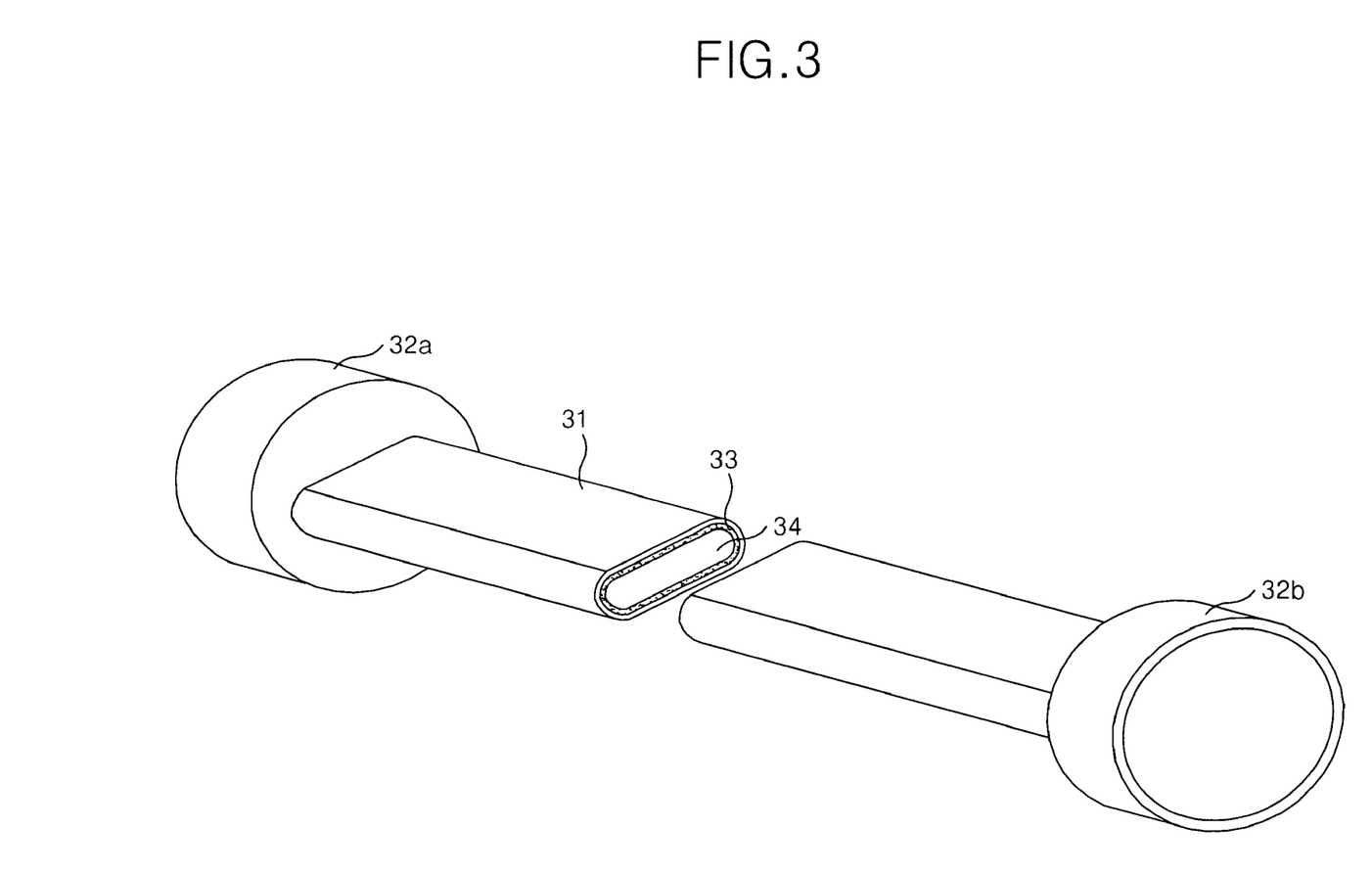
FIG. 3 is a perspective view of the lamp according to the first embodiment of the present invention.

FIG. 2 and FIG. 3 show a lamp according to a first embodiment of the present invention.

Referring to FIG. 2 and FIG. 3, a lamp 30 according to the first embodiment of the present invention is a DEFL (Differential Electrode Fluorescent Lamp), and includes a glass tube 31 or a transparent tube, a section in an electrode portion EP1 and EP2 that is substantially circular and a section in an emitter LP that is substantially elliptical, electrodes 32a and 32b formed at an external surface of the glass tube 31 in the electrode portion EP1 and EP2, a fluorescent material 33 formed at an internal surface of the glass tube 31 in the emitter LP, and an inactive gas (or a discharge gas) 34 sealed within the glass tube 31.

If the glass tube 31 of the emitter LP portion is substantially elliptical to thereby shorten a minor axis length, then the distance between a plasma density and a fluorescent material within a discharge tube may be shortened. Thus, proton efficiency for exciting the fluorescent material may be improved, so that it may become possible to improve efficiency and brightness. Also, an area in which the fluorescent material is excited in comparison to a circular type glass tube may be increased to thereby increase efficiency and brightness.

If the glass tube 31 section of the electrode portion EP1 and EP2 is formed substantially circular thus increasing an area of the electrodes 32a and 32b, then a length of an external electrode, that is, an electrode length of the electrode portion EP1 and EP2 is reduced. As a result, bezel width of a liquid crystal module is decreased thus enlarging a display screen. Also, if an external diameter of the electrode portion EP1 and EP2 in the emitter LP is substantially shorter than the major axis length of the glass tube, then a length of the external electrode can be reduced and productivity may be increased upon formation of the electrode.

The major axis length and the minor axis length of the glass tube 31 in the emitter LP must be designed so that efficiency and brightness are very good.

Figure 4:
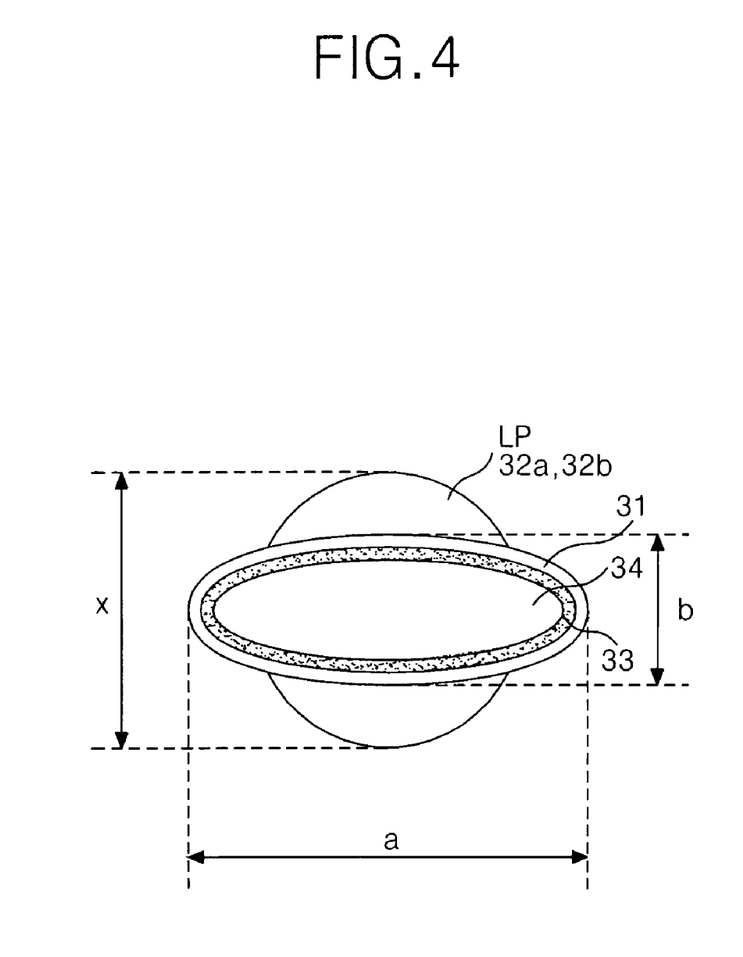
FIG. 4 is a vertical-sectional view of the lamp according to the first embodiment of the present invention.

FIG. 4 is a vertical-sectional view showing a lamp section of the present invention where the glass tube minor axis-direction length of the emitter LP is substantially shorter than the glass tube diameter x of the electrode portion EP1 and EP2, and the glass tube major axis-direction length of the emitter LP is substantially longer than the glass tube diameter x of the electrode portion EP1 and EP2.

If a diameter of the external electrodes 32a and 32b is represented by 'x', the major axis length of the glass tube 31 in the emitter LP is 'a' and the minor axis length of the glass tube 31 in the emitter LP is 'b' shown in FIG. 4, then a ratio of the major axis length 'a' and the minor axis length 'b' of the glass tube 31 in the emitter LP may be calculated as shown in Equation 1.

$$\frac{\pi * x}{2} = \sqrt{(a^2 - b^2)\sin^2\theta + b^2} \qquad \text{[Equation 1]}$$

The diameter of the external electrodes 32a and 32b is 'x', and the major axis length 'a' of the glass tube 31 in the emitter LP is a maximum value '2x'. In this case, the minor axis length 'b' of the glass tube 31 in the emitter LP is zero.

Figure 5:
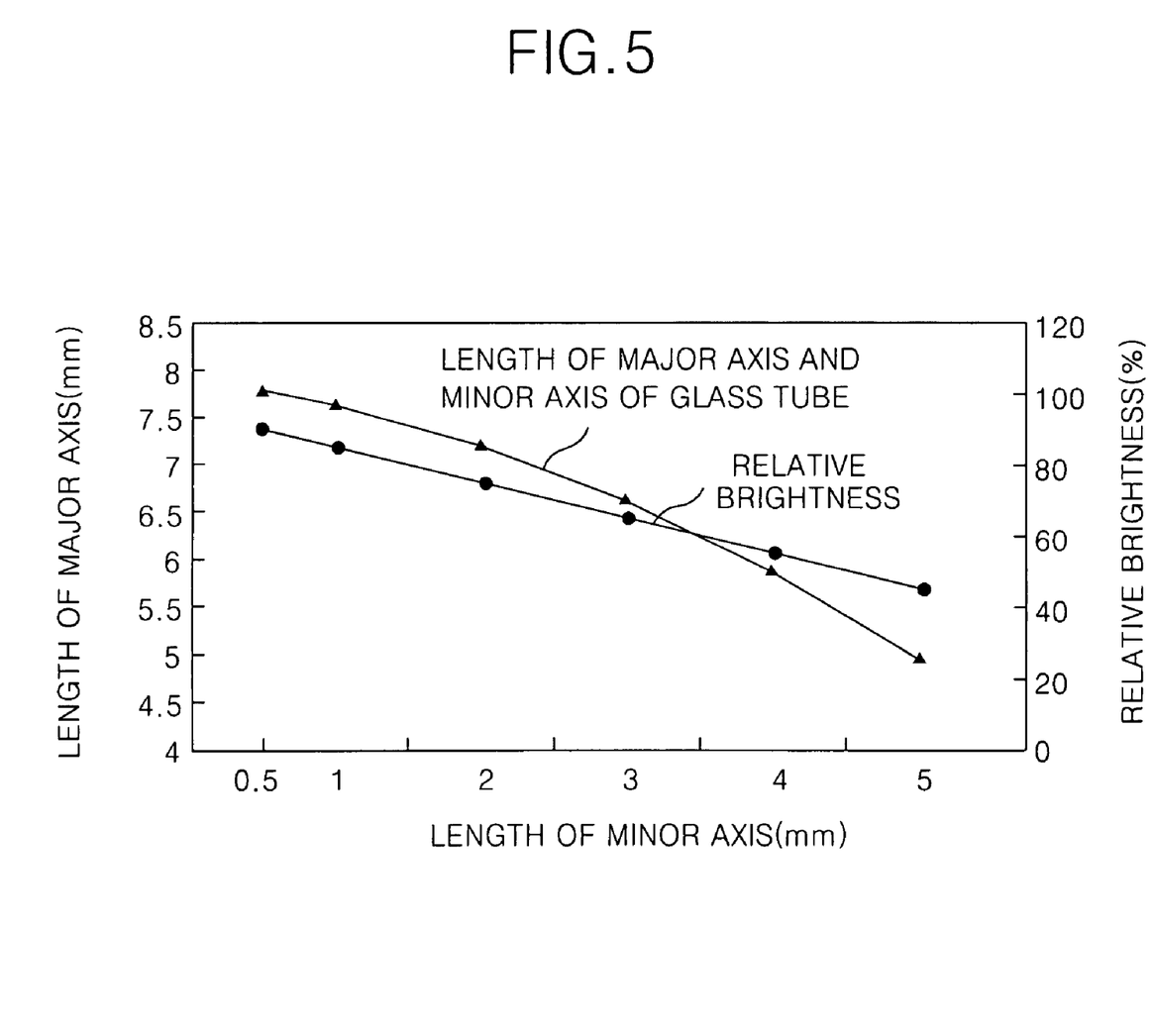
FIG. 5 is a graph showing a ratio of a major axis length and a minor axis length of the glass tube in the lamp according to the first embodiment of the present invention.

FIG. 5 shows the major axis length 'a' and the minor axis length 'b' of the glass tube and a relative brightness in the emitter LP.

Referring to FIG. 5, the major axis length of the glass tube in consideration of the present fabricating process is approximately 1.01~1.6 times the minor axis length. In an optimum optical efficiency, when the glass tube minor axis length in the emitter LP is 1, the major axis length is approximately 1.01~1.6 times the minor axis length. If the major axis length on the minor axis length of the glass tube is less than about 1.3 times, then improved efficiency over that of the related art is almost nothing. On the other hand, if the minor axis length in comparison to the major axis length is shortened, then brightness is increased, but if the minor axis length is overly shortened until the major axis length in comparison to the minor axis length is more than about 1.6 times, then efficiency is lowered by an increase of power consumption.

In other words, when a ratio of the major axis length and the minor axis length is approximately 1.3~1.6, efficiency and brightness may be optimized.

The glass tube 31 having substantially different geometries for their sections which are not united may be made in a single process. A method of fabricating the glass tube 31 having a partially different section figure follows. First, the glass tube in which a whole section is substantially circular and a fluorescent material 33 is formed inside and a sealed inactive gas 34 is first-molded. Next, the emitter EP of the glass tube is melted by heating with a burner or a heater box, and only the glass tube of the emitter EP is second-molded into a substantially elliptical section by using a roller, a jig and a mold, for example.

On the other hand, if the glass tubes having a substantially different diameter and a geometry are united, then it is possible that a discharge gas within the glass tube at the junction thereof upon uniting of the glass tubes may leak. Thus, the lamp may not properly be secured. Care must be taken when uniting glass tubes of different geometries.

Figure 6:
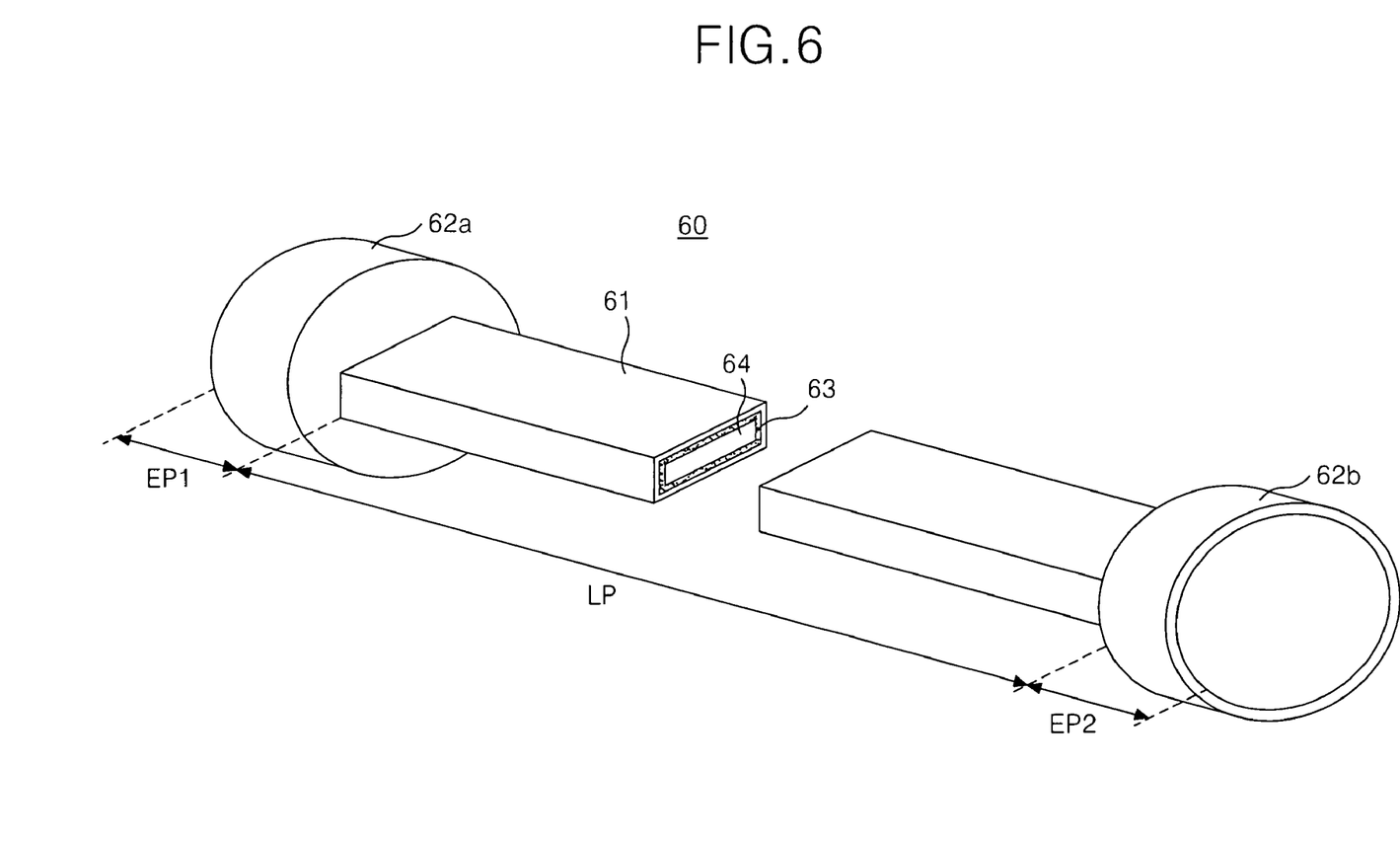
FIG. 6 is a perspective view of the lamp according to a second embodiment of the present invention.
Figure 7:
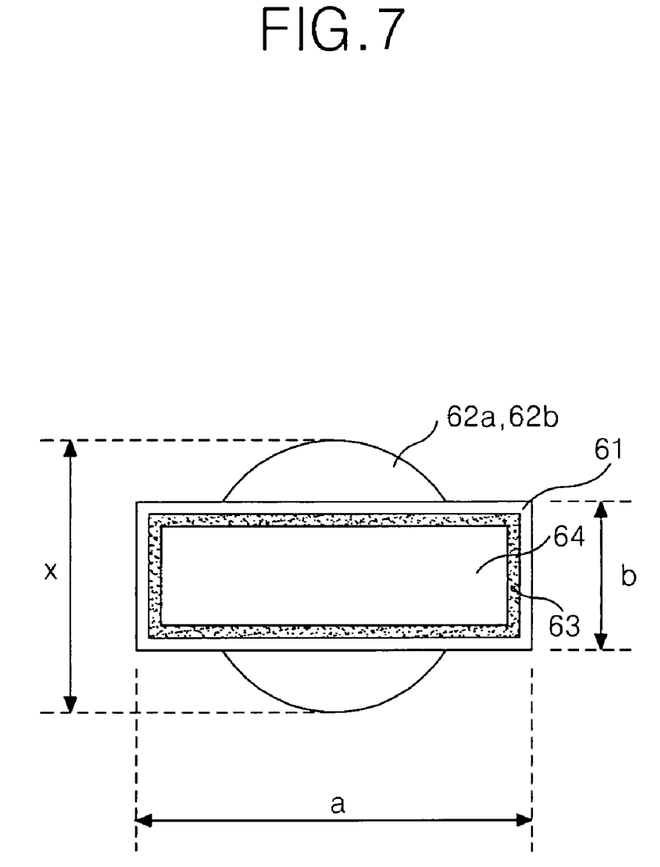
FIG. 7 is a vertical-sectional view of the lamp according to the first embodiment of the present invention.

FIG. 6 and FIG. 7 are drawings showing the lamp according to a second embodiment of the present invention and a vertical-sectional view of the lamp according to a first embodiment, respectively.

Referring to FIG. 6 and FIG. 7, the lamp 60 according to a second embodiment (as shown in FIG. 6) of the present invention includes a glass tube 61 of a section in an electrode portion EP1 and EP2 substantially circular and a section in the emitter LP is substantially rectangular, electrodes 62a and 62b formed at an external surface of a glass tube 61 in the electrode portion EP1 and EP2, a fluorescent material 63 formed at an internal surface of the glass tube 61 in the emitter LP, and an inactive gas 64 sealed within the glass tube 61.

If the glass tube 61 section of the emitter LP is formed substantially rectangular to shorten a minor axis length, then the distance between a plasma density and a fluorescent material within a discharge tube may be shortened. Thus, proton efficiency for exciting the fluorescent material may be improved, so that it may become possible to improve efficiency and brightness. Also, an area in which the fluorescent materials is excited in comparison to a substantially circular type glass tube may be increased to thereby increase efficiency and brightness.

Also, if the glass tube 61 section of the electrode portion EP1 and EP2 is formed substantially circular to thereby increase an area of the electrodes 62a and 62b, then a current density within the discharge tube may be increased. Thus, efficiency is increased.

The major axis length and the minor axis length of the glass tube 61 in the emitter LP must be designed taking into consideration efficiency and brightness. Since the design conditions are substantially the same as those of the first embodiment of the present invention, the detailed description will be omitted.

The glass tube 61 that a section in the electrode portion EP1 and EP2 is the substantially circular type and a section in the emitter LP is the substantially rectangular type may be manufactured in a single process without a uniting process. A method of fabricating the glass tube 61 is as follows. First, the glass tube including a whole section of a substantially circular type and a fluorescent material 63 formed inside and a sealed inactive gas 64 are first-molded. Next, the emitter EP of the glass tube is melted by heating with a burner or a heater box, and only the glass tube of the emitter EP is second-molded into a substantially rectangular section by using a roller, a jig and a mold, for example.

Figure 8:
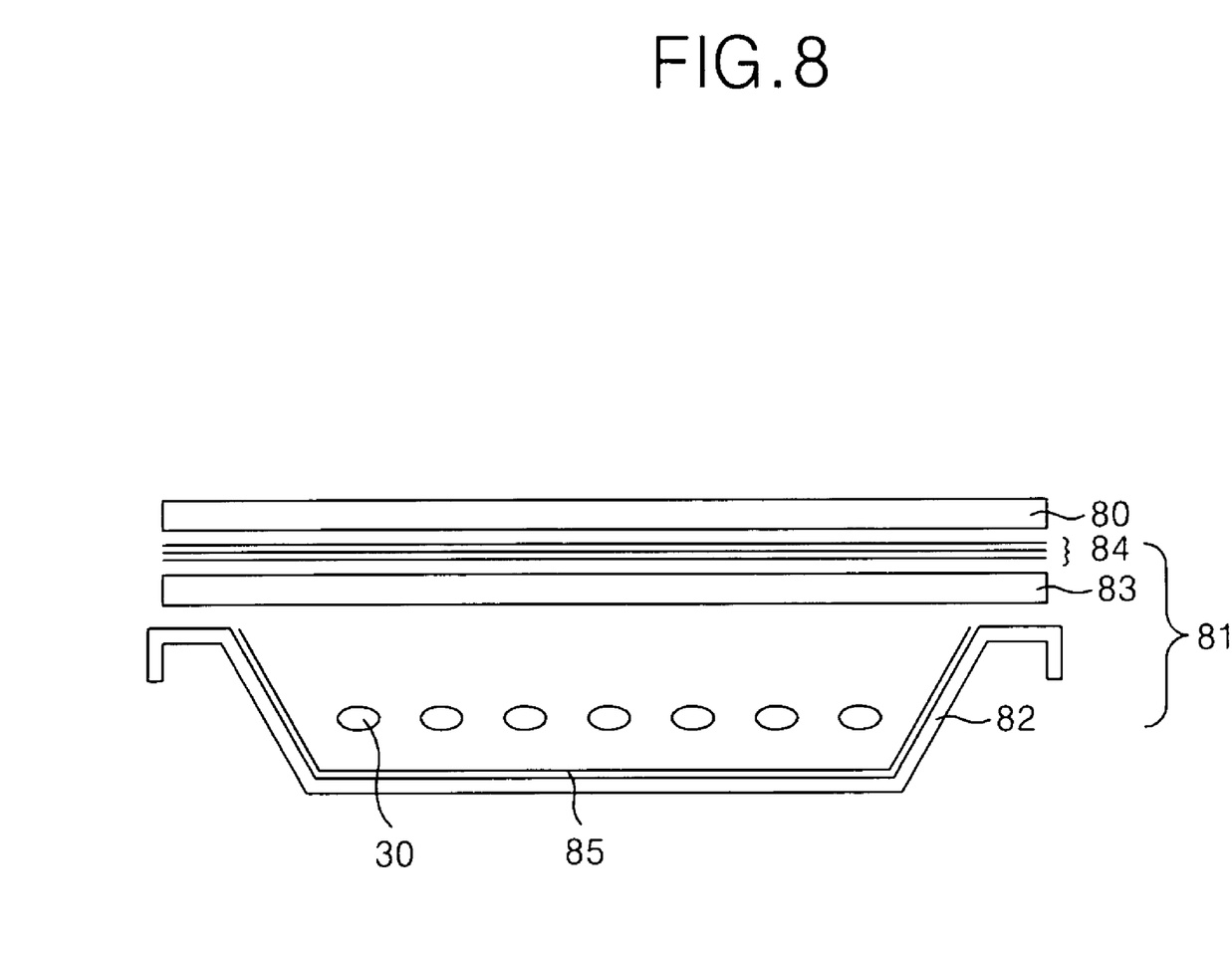
FIG. 8 is a sectional view showing a liquid crystal display according to the first embodiment of the present invention.

FIG. 8 is a sectional view showing a liquid crystal display according to the first embodiment of the present invention.

Referring to FIG. 8, the liquid crystal display according to the present invention includes a direct-type back light unit 81 including the lamp 30 having a substantially elliptical geometry, and a liquid crystal panel 80 electrically controlling a liquid crystal in accordance with a video data and modulating a light irradiated from the back light unit 81 to thereby display a picture.

A liquid crystal panel 80 may include a spacer for keeping a constant distance between the upper substrate and the lower substrate. A color filter, a common electrode and a black matrix, etc., may be formed on the upper substrate of the liquid crystal panel 80. Also, a signal wiring such as a plurality of data lines and a plurality of gate lines, etc., at the lower substrate of the liquid crystal panel 80, and a thin film transistor (hereinafter, referred to as "TFT") may be formed at an intersection of the data line and the gate line. The TFT switches a data signal to be transmitted from the data line in response to a scanning signal (a gate pulse) from the gate line. A pixel electrode may be formed at a pixel area between the data line and the gate line. Also, pads connected to the data lines and the gate lines may be formed at an edge of the lower substrate, respectively, and a Tape Carrier Package integrated with a drive integrated circuit for applying a driving signal to the TFT may be attached at the pads. The drive integrated circuits may be attached in a Chip On Glass type onto a glass substrate and may be directly formed on the glass substrate along with the signal wiring of a pixel area and the TFT.

The direct-type back light unit 81 includes the lamps 30 arranged under the liquid crystal panel 80, a reflection sheet 85 arranged under the lamps 30, a bottom cover 82 attached to the reflection sheet 85, a diffusion plate 83 attached at an upper portion of the bottom cover 82, and a plurality of optical sheets 84 arranged substantially between the diffusion plate 83 and the liquid crystal panel 80.

The lamp 30 is a lamp according to the first embodiment of the above-mentioned present invention, and a wide surface area is illuminated and emitted by an alternating electric power from an inverter (not shown) facing the liquid crystal panel 80.

The bottom cover 82 includes a bottom surface and a substantially inclined side surface, and is formed in an opened structure with an upper portion facing the diffusion plate 83. The reflection sheet 85 is attached at an internal bottom surface and the side surface of the bottom cover 82, and the plurality of lamps 30 is enclosed with the internal space. The reflection sheet 85 reflects light incident from the lamps 30 to increase light efficiency incident onto the diffusion plate 83.

The diffusion plate 83 may include a plurality of beads for scattering light and diffuses light incident from the lamps 30 to thereby reduce a brightness difference of a position of each lamp 30 and a position between the lamps 30 so that it may become possible to reduce the degree at which bright lines are perceived from the lamps 30. And, the diffusion plate 83 plays a role to cover an upper aperture portion of the bottom cover 82 and support the optical sheets 84.

The optical sheets 84 may include one or more prism sheets and one or more diffusion sheets, and contributes to uniform irradiation of light incident from the diffusion plate 83 into the entire liquid crystal panel 80 and turn a progress path of light toward a vertical direction on a mark surface to increase brightness at the front of the mark surface.

Figure 9:
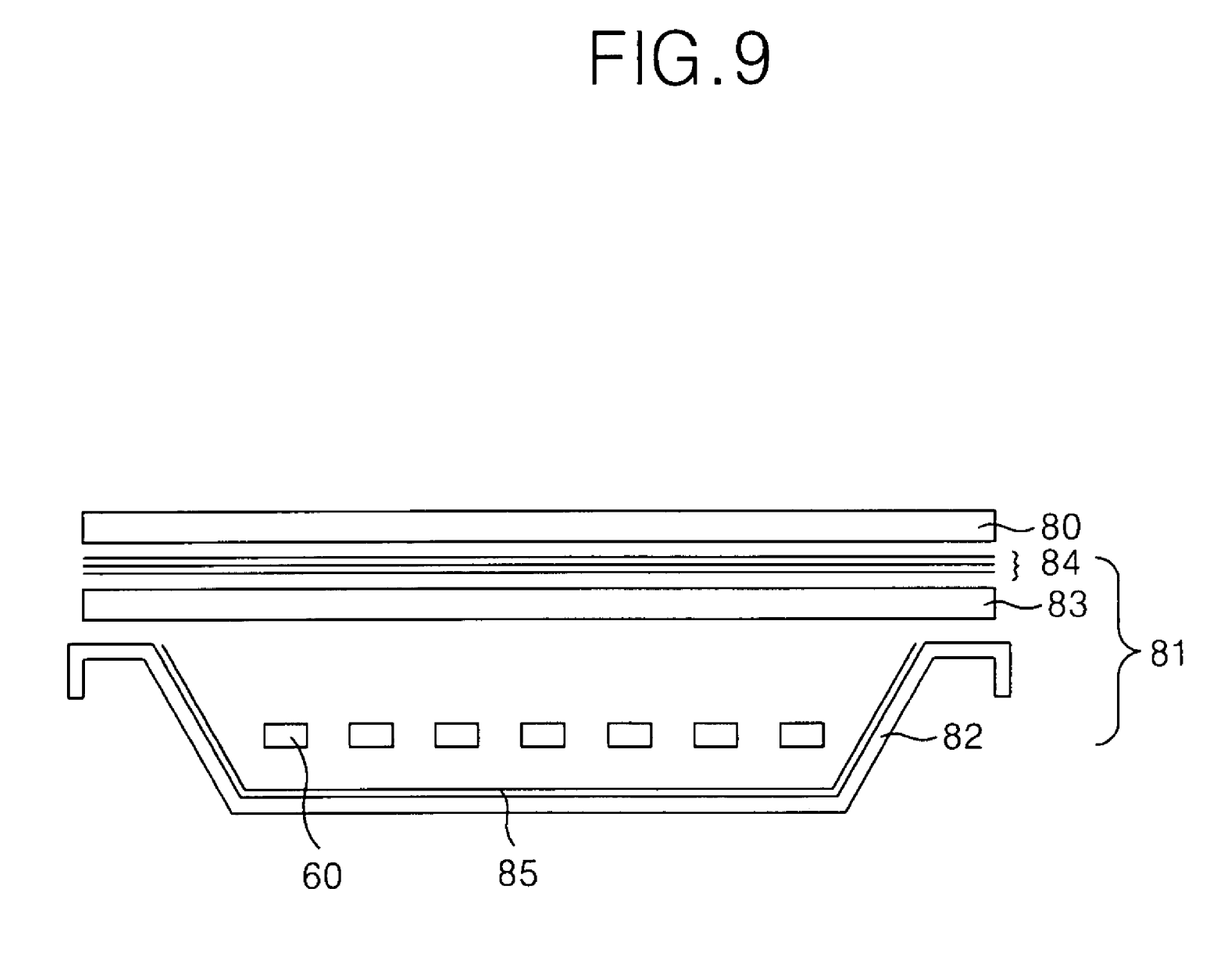
FIG. 9 is a sectional view showing a liquid crystal display according to the second embodiment of the present invention.

FIG. 9 shows a sectional view of a liquid crystal display according to the second embodiment of the present invention. In FIG. 9, same reference numerals appear as in FIG. 8 and an explanation as to the same elements will be omitted.

Referring to FIG. 9, the liquid crystal display according to the present invention includes a direct-type back light unit 81 including lamps 60 having a substantially rectangular section, and a liquid crystal panel 80 electrically controlling a liquid crystal in accordance with a video data and modulating a light irradiated from the back light unit 81 to thereby display a picture.

The lamp 60 is a lamp according to the second embodiment of the above-mentioned present invention, and a wide surface area is illuminated and emitted by an alternating electric power from an inverter (not shown) facing the liquid crystal panel 80.

Figure 10:
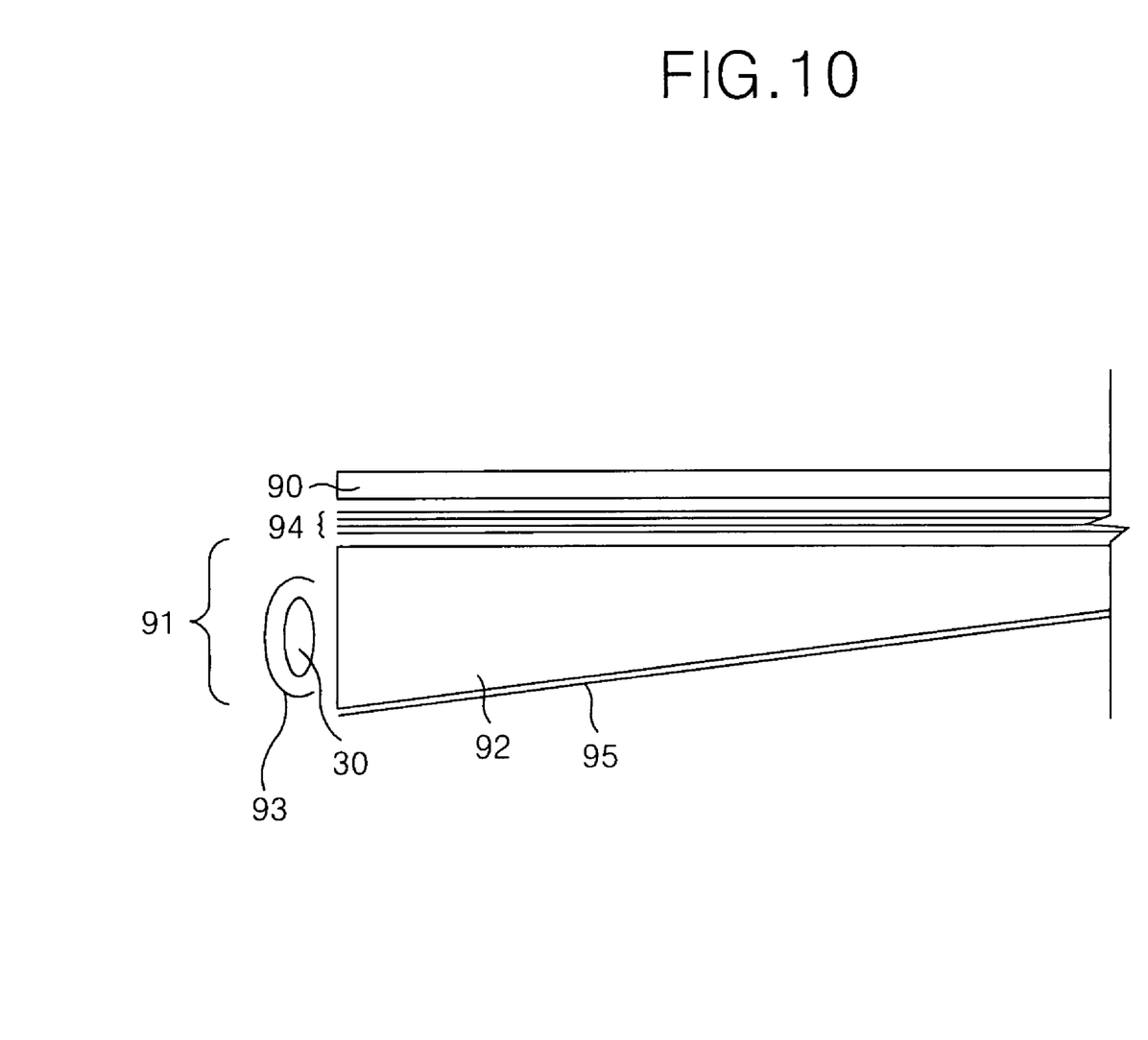
FIG. 10 is a sectional view showing a liquid crystal display according to a third embodiment of the present invention.

FIG. 10 shows a sectional view of liquid crystal display according to a third embodiment of the present invention.

Referring to FIG. 10, the liquid crystal display according to the present invention includes an edge-type back light unit 91 including the lamp 30 having a substantially elliptical type section, and a liquid crystal panel 90 electrically controlling a liquid crystal in accordance with a video data and modulating a light irradiated from the back light unit 91 to thereby display a picture.

Since the liquid crystal panel 90 is substantially the same as the above-mentioned embodiment, a detailed explanation will be omitted.

The edge-type back light unit 91 includes the lamp 30 arranged at an edge and/or another edge of the back light unit 91, a lamp housing 93 partially enclosing the lamp 30, a light plate 92 converting a light from the lamp 30 into a surface light source, a reflection sheet 95 opposite to a low surface of the light guide plate 92, and a plurality of optical sheets 94.

The lamp 30 is a lamp according to the first embodiment of the above-mentioned present invention, and a wide surface area is illuminated and emitted by an alternating electric power from an inverter (not shown) facing the liquid crystal panel 80.

The lamp housing 93 is installed at a support main (not shown) in such a manner to enclose an upper, a lower and a rear surface of the lamp 30 other than an exit surface of the lamp 30 opposite to an incident surface of the light guide plate 92. The lamp housing 93 reflects a light incident from the lamp 30 to improve incident light efficiency of the light guide plate 92.

The light guide plate 92 converts light incident from a line light source lamp 30 into a surface light source to irradiate light in a surface light source type into the optical sheets 94 and to support the optical sheets 94.

The reflection sheet 95 reflects a light incident from the light guide plate 92 toward the optical sheets 94 to improve incident light efficiency of the optical sheets 94.

The optical sheets 94 may include one or more prism sheets and one or more diffusion sheets, and may uniformly irradiate a light incident from the light guide plate 92 into the entire liquid crystal panel 90 and turn a progress path of a light toward a vertical direction on a mark surface to increase brightness at the front of the mark surface.

Figure 11:
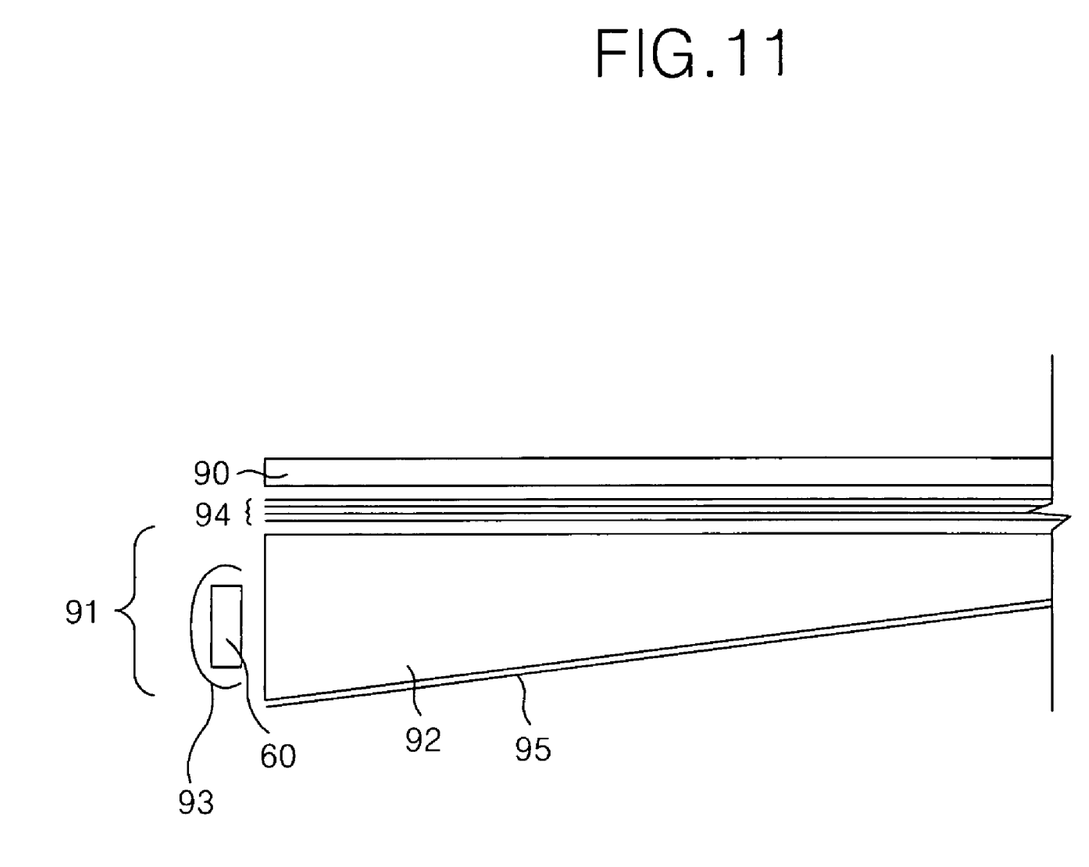
FIG. 11 is a sectional view showing a liquid crystal display according to a fourth embodiment of the present invention.

FIG. 11 shows a sectional view of liquid crystal display according to a fourth embodiment of the present invention. In FIG. 11, same reference numerals appear as in FIG. 10 and an explanation as to the same elements will be omitted.

Referring to FIG. 11, the liquid crystal display according to the present invention includes an edge-lit back light unit 91 including the lamp 60 having a substantially rectangular type section, and a liquid crystal panel 90 electrically controlling a liquid crystal in accordance with a video data and modulating a light irradiated from the back light unit 91 to thereby display a picture.

The lamp 60 is a lamp according to the second embodiment of the above-mentioned present invention, and a wide surface area is illuminated and emitted by an alternating electric power from an inverter (not shown) facing the liquid crystal panel 90.

As above-mentioned, in a lamp according to the present invention and a back light unit thereof, a lamp section of the emitting area is formed of a substantially elliptical or substantially rectangular geometry to thereby improve a plasma density of the lamp in the emitting area and to widen the emitting area, so that it may become possible to improve light efficiency and brightness. Also, in the lamp and the back light unit according to the present invention, the emitter of the lamp and the glass tube of the electrode portion may be manufactured in a single process, so that it may become possible to prevent a crack of a junction generated upon uniting the emitter and the electrode portion.

A liquid crystal display according to the present invention may improve brightness and reduce power consumption using the lamp and the back light unit.

It will be apparent to those skilled in the art that various modifications and variations can be made according to the present invention without departing from the spirit or scope of the invention. Thus, it is intended that the present invention cover the modifications and variations of this invention provided they come within the scope of the appended claims and their equivalents.

What is claimed is:

1. A lamp, comprising:
a transparent tube sealed with a discharge gas, the transparent tube having an emitter section and an electrode section;
a fluorescent material formed within the emitter section that generates light; and
electrodes installed at both sides of the glass tube,
wherein the emitter section and the electrode section where the electrodes are installed are substantially different from each other, wherein the electrode is formed on external side of the glass tube, and
wherein in the emitter section, a minor axis length of the transparent tube is substantially shorter than the diameter of the electrode section, and a major axis length of the transparent tube is substantially longer than the diameter of the electrode section of the transparent tube.

2. The lamp as claimed in claim 1, wherein the major axis length of the transparent tube is about 1~1.6 times the minor axis length of the transparent tube.

3. A back light unit, comprising:
a plurality of lamps including a transparent tube including a sealed discharge gas wherein the transparent tube has an emitter section and an electrode section, a fluorescent material formed within the transparent tube in the emitter section generating a light and electrodes installed at both sides of the glass tube and the emitter section and the electrode section where the electrodes are installed are substantially different from each other,
a bottom cover enclosing the plurality of lamps in such a manner that a wide surface of the transparent tube substantially faces upward and a reflection sheet formed under the lamps;
a diffusion plate covering the bottom cover and diffusing a light from the lamps; and
a plurality of optical sheets arranged on the diffusion plate,
wherein the electrode is formed on external side of the glass tube, and
wherein in the emitter section, a minor axis length of the transparent tube is substantially shorter than a diameter of the electrode section, and a major axis length of the transparent tube is substantially longer than the diameter of the electrode section of the transparent tube.

4. The back light unit as claimed in claim 3, wherein the major axis length of the transparent tube is about 1~1.6 times the minor axis length of the transparent tube.

5. A back light unit, comprising:
at least one lamp including a transparent tube with a sealed discharge gas wherein the transparent tube has an emitter section and an electrode section, a fluorescent material formed within the transparent tube in the emitter section generating a light and electrodes installed at both sides of the glass tube and wherein emitter section and the electrode section where the electrodes are installed are substantially different from each other, a light guide plate converting the light incident from an incident surface facing the wide surface of the transparent tube into a surface light source type; and a plurality of optical sheets arranged on the light guide plate, wherein the electrode is formed on external side of the glass tube, and wherein in the emitter section, a minor axis length of the transparent tube is substantially shorter than a transparent tube diameter of the electrode section, and a major axis length of the transparent tube is substantially longer than the diameter of the electrode section of the transparent tube.

6. The back light unit as claimed in claim 5, further comprising:

a lamp housing enclosing the lamp at a portion other than an exit surface of the lamp substantially opposite to an incident surface of the light guide plate.

7. The back light unit as claimed in claim 5, wherein the major axis length of the transparent tube is about 1~1.6 times the minor axis length of the transparent tube.

8. A liquid crystal display, comprising:

a back light unit including a transparent tube with a sealed discharge gas wherein the transparent tube has an emitter section and an electrode section, a fluorescent material formed within the transparent tube in the emitter section generating a light and electrodes installed at both sides of the glass tube and wherein the emitter section and the electrode section where the electrodes are installed are substantially different from each other, a plurality of lamps having the emitter section, a bottom cover enclosing the plurality of lamps such that a wide surface of the transparent tube substantially faces upward and a reflection sheet formed under the lamps, a diffusion plate covering the bottom cover and diffusing a light from the lamps, and a plurality of optical sheets arranged on the diffusion plate; and a liquid crystal panel electrically controlling a liquid crystal and modulating a light irradiated from the back light unit to thereby display a picture, wherein the electrode is formed on external side of the glass tube, and wherein in the emitter section, a minor axis length of the transparent tube is substantially shorter than a transparent tube diameter of the electrode section, and a major axis length of the transparent tube is substantially longer than the diameter of the electrode section of the transparent tube.

9. The liquid crystal display as claimed in claim 8, wherein the major axis length of the transparent tube is about 1~1.6 times the minor axis length of the transparent tube.

10. A liquid crystal display, comprising:

a back light unit including a transparent tube with a sealed discharge gas wherein the transparent tube has an emitter section and an electrode section, a fluorescent material formed within the emitter section generating a light and electrodes installed at both sides of the glass tube and wherein a the emitter section and the electrode section where the electrodes are installed are substantially different from each other, at least one lamp having the emitter section, a light guide plate converting the light incident from an incident surface facing the wide surface of the transparent tube into a surface light source type, and a plurality of optical sheets arranged on the light guide plate; and a liquid crystal panel electrically controlling a liquid crystal and modulating a light irradiated from the back light unit to thereby display a picture, and wherein the electrode is formed on external side of the glass tube, wherein in the emitter section, a minor axis length of the transparent tube is substantially shorter than a transparent tube diameter of the electrode section, and a major axis length of the transparent tube is substantially longer than the diameter of the electrode section of the transparent tube.

11. The liquid crystal display as claimed in claim 10, wherein the major axis length of the transparent tube is about 1~1.6 times the minor axis length of the transparent tube.

* * * * *